United States Patent [19]

Proehl

[11] Patent Number: 4,752,846
[45] Date of Patent: Jun. 21, 1988

[54] TAPE DRIVE SYSTEM WITH TAPE POSITION CAPTURE CIRCUITRY

[75] Inventor: Kraig A. Proehl, Loveland, Colo.

[73] Assignee: Hewlett-Packard Company, Palo Alto, Calif.

[21] Appl. No.: 916,982

[22] Filed: Oct. 9, 1986

[51] Int. Cl.⁴ .......................... G11B 5/09; G11B 15/52
[52] U.S. Cl. .................................. 360/72.2; 360/74.4
[58] Field of Search .............................. 360/72.2, 74.4

[56] References Cited

U.S. PATENT DOCUMENTS

| | | | |
|---|---|---|---|
| 3,727,203 | 4/1973 | Crossman | 360/72.2 |
| 4,321,632 | 3/1982 | Leis et al. | 360/72.2 |
| 4,393,445 | 7/1983 | Milligan et al. | 360/72.2 |

Primary Examiner—Raymond F. Cardillo
Assistant Examiner—David L. Robertson
Attorney, Agent, or Firm—Jeffery B. Fromm

[57] ABSTRACT

A tape drive system employs position capture circuitry to facilitate accurate positioning of the tape media. The position capture circuitry includes an input polling state machine (101) to ensure each detection results in exactly one position value transfer. A timing section (103) synchronizes the polling of inputs with data transfers. A bus multiplexing section (105) provides for 12-bit resolution over 8-bit busses. The position types can be data block boundaries or reel-encoder marks or position requests by the servo controller. The input lines (41–44) are polled routinely, ensuring that the stored values precisely reflect the referenced positions.

2 Claims, 4 Drawing Sheets

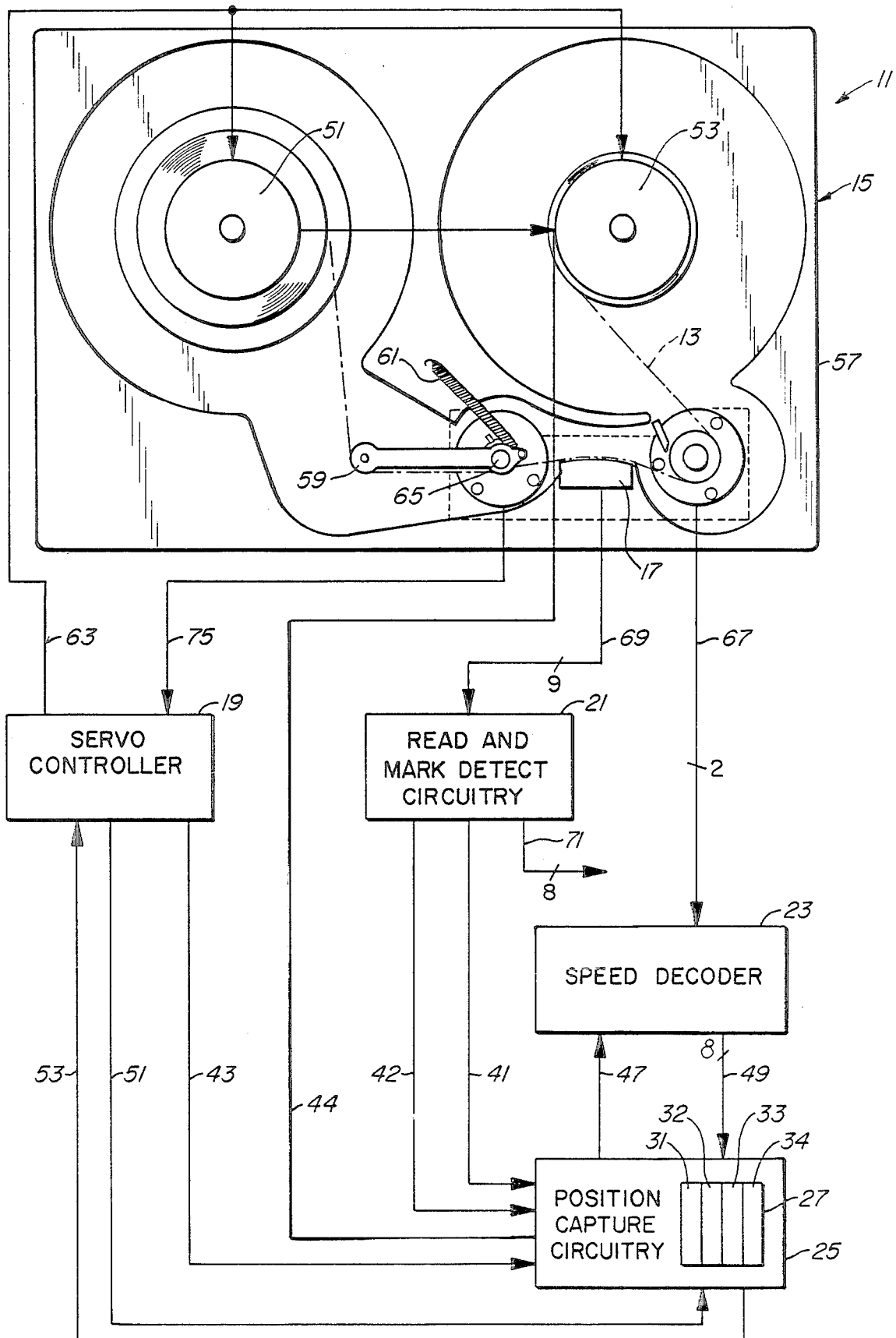
FIG._1.

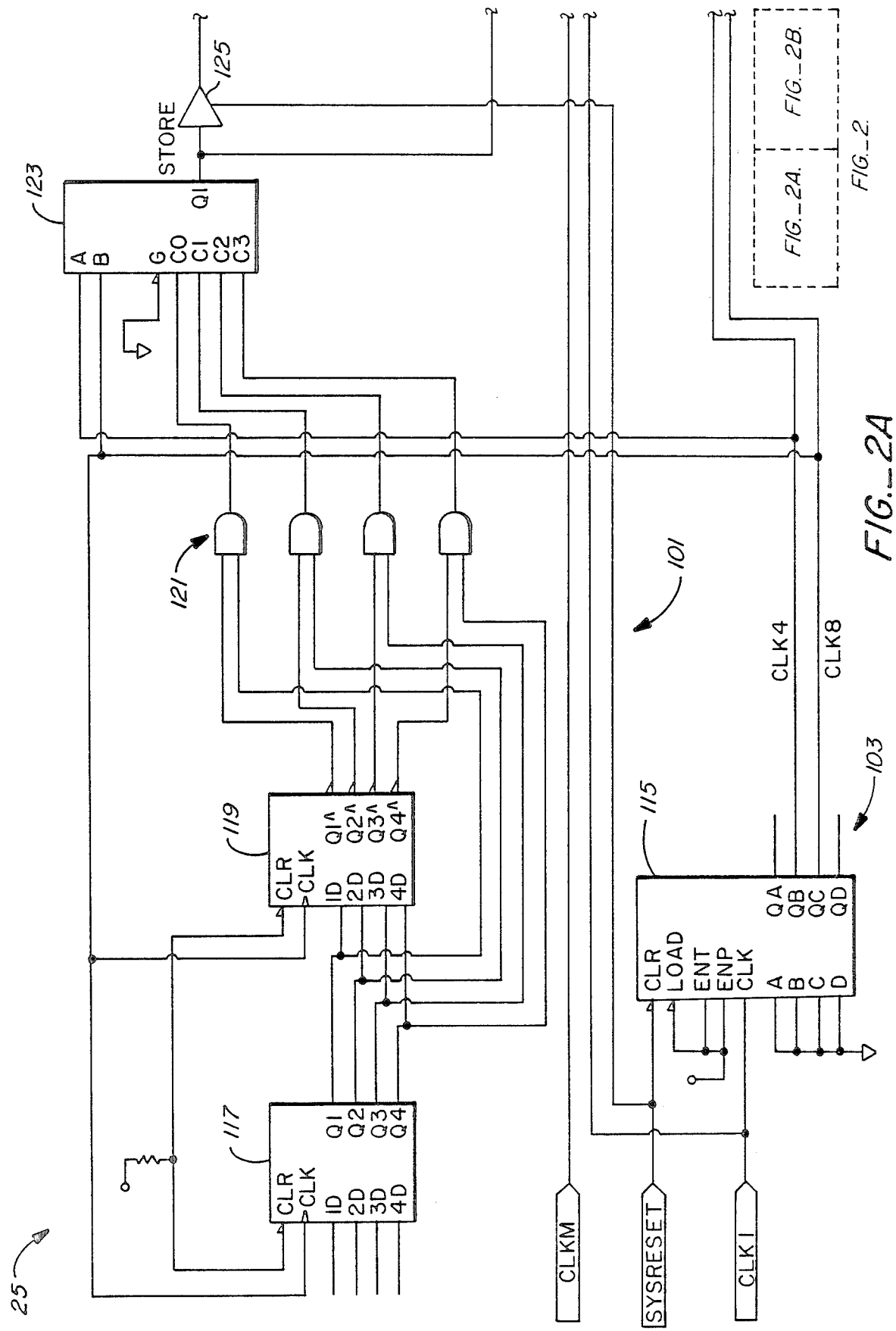
FIG._2A

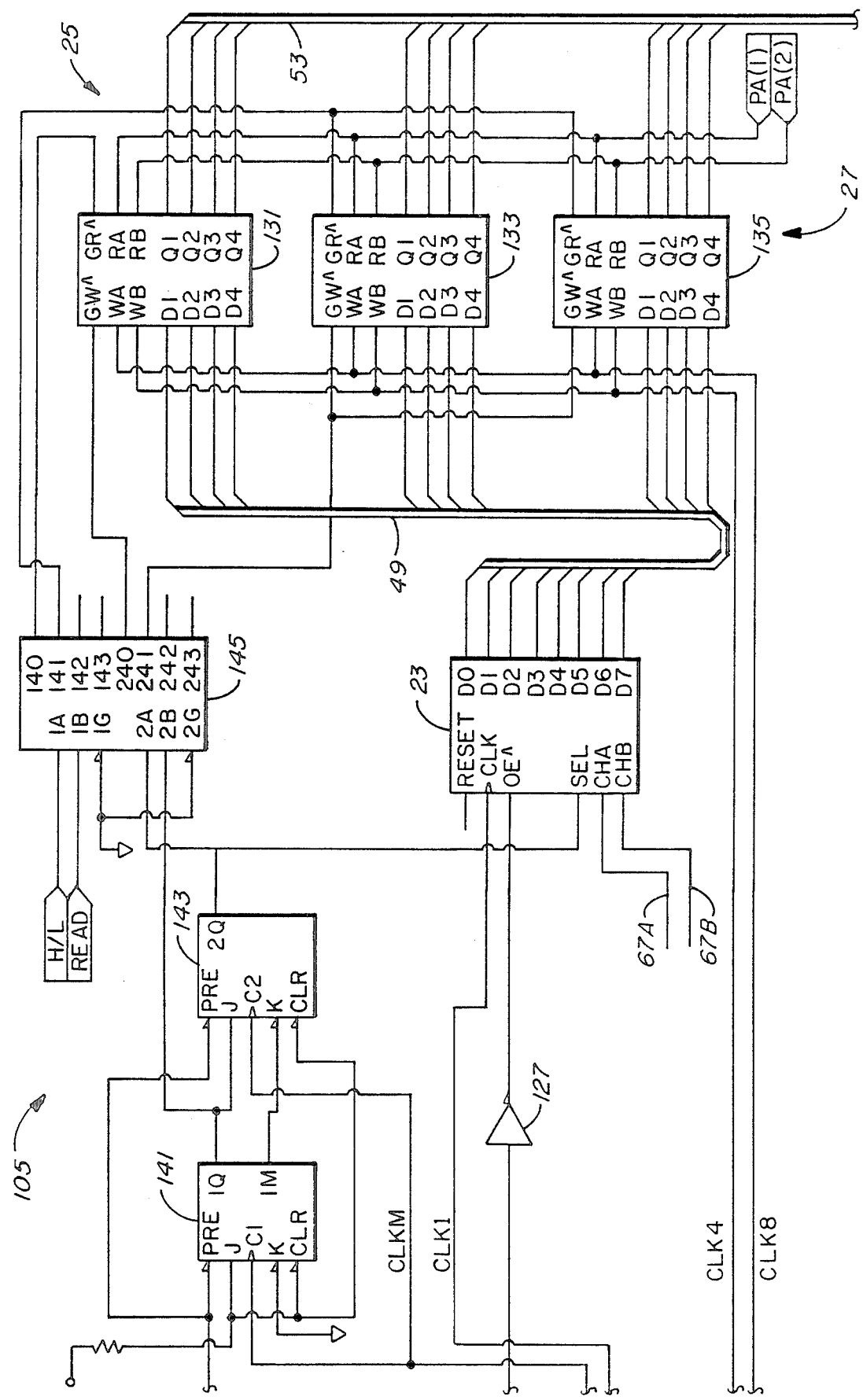
FIG._2B

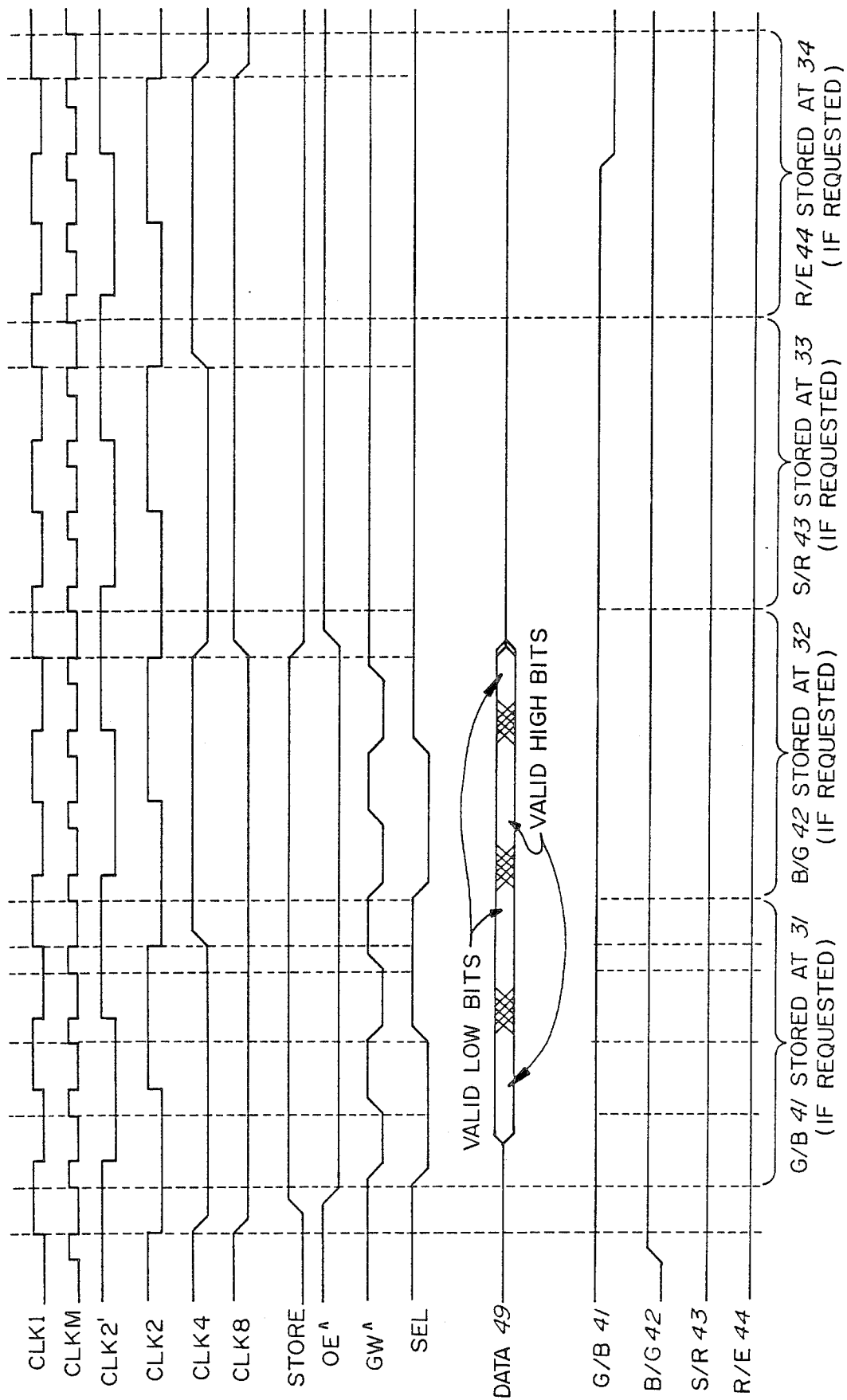

TAPE DRIVE SYSTEM WITH TAPE POSITION CAPTURE CIRCUITRY

BACKGROUND OF THE INVENTION

The present invention relates to tape drive systems for reading tape being transferred relative to a transducer, and, more particularly, to such a system incorporating position capture circuitry for more precise positioning of the tape relative to position marks recorded on the tape. While its scope is not so limited, the present invention arose during development of a streaming tape drive for magnetic recording tape.

The elongated form of tape is well-suited for storing information that is likewise much longer than it is wide. This includes most processable information, even information presented in parallel streams of data. In addition to having an appropriate morphology, tape can generally be fed from and wound about reels for compact storage and convenient access.

A widely used tape storage medium is magnetic recording tape, in which information is stored as flux levels in the magnetic medium. Magnetic tape media can provide for storage of both analog information, as in common video and audio decks, and digital information, e.g., when used for secondary computer storage. Alternative tape media include "old" technologies, such as punched paper tape, and "new" technologies, such as laser-etched holograms on polyester film, as well as current technologies, such as movie film.

Each of these technologies requires a transducer for converting the information as stored on the tape to processable information, and vice-versa. "Processable" is taken relative to a processing technology. With respect to modern digital electronics processing circuitry, information can be presented in binary form as represented by discrete voltage levels. Different information processing technologies require alternative forms of processable information. Likewise, "transducer" is relative to the combined selections of form of stored information and form of processable information. The transducer generally includes a head, e.g., read head, projector lamp, laser pick-up, across and relative to which tape must be transferred to convert information to processable form.

This transfer can be performed by a drive mechanism. In the case of a streaming tape drive, the drive mechanisms can include a supply or load reel, a take-up reel or hub, and one or two motors to supply power to these reels. Also typically included are guides to precisely align and transversely position the tape with respect to the head. Generally, a streaming tape drive system includes a buffer arm or other means for regulating the tension of the tape during transfer.

The drive mechanism is controlled and regulated by a servo, generally microcontroller-based, which responds to external inputs and to internal feedback in directing the motors to stop, start, increase speed or decrease speed. Examples of servo controller functions include: adjusting the transfer speed in response to feedback from a tape speed sensor that an appropriate speed is not being maintained; differentially adjusting the speeds of the supply and take-up reels in response to feedback from a buffer arm position sensor indicating that tape tensioning needs to be adjusted; and issuing a decrease speed command followed by a stop as a comparison of data supply-reel speed sensor and the tape speed sensor indicate that the supply-reel is almost empty.

In higher performance tape drive systems, the information stored on the tape contains more than the data which is to be stored and retrieved. Included in the data stream along with this "user" data is "system" data designed to facilitate the action of the system in recording and retrieving the "user" data. The system data can include, for example, error correction codes, synchronization marks, various data block identification marks, and data block boundary marks. In the last case, data is generally organized into blocks, the boundaries of which can be marked by specific flux patterns on magnetic tape, or simply by the absence of data activity for a specified minimum tape length, or by a combination of the two approaches.

Sophisticated read circuitry includes sections for detecting and initiating actions as indicated by "system data". Among the functions performed by the read system is the determination of when a read, or write, has failed so that a retry is necessary. The determination that a retry is necessary is forwarded to the servo, which, for example, commands the drive system to stop, back-up and re-read, or re-write, the block in which an uncorrectable error was indicated.

Such a retry operation can be quite complex, especially in the case of high-performance streaming tape drives due to the high speed of tape transfer, large angular momentum of the reels, and resultant delays during starting and stopping. To retry, it is generally necessary to re-try the entire block of data in which an error occurred. In order to effect a retry, the servo must command the drive mechanism to stop the transfer of tape. A significant delay necessarily occurs between issuance of the command and its execution, during which time, the tape changes position. The servo then must direct the drive mechanism to backspace the tape over the distance the tape moved since the stop command was issued, over the distance the tape moved between error detection and issuance of the stop command, over the distance between the beginning of the data block, and over an additional distance required for the drive mechanism to bring the tape transfer up to speed before reaching the beginning of the block to be re-read.

In less sophisticated tape drive systems, such as home audio decks, the retry, which is, of course, user regulated, can be crudely implemented by backing the tape "more than enough", so that the necessary retry is effected, although some "redundant" good data is also re-read. Given that data block boundaries are marked, a more sophisticated system can also back up "more than enough" and discard data prior to the detection of an appropriate block boundary. However, this can be timewise inefficient and can introduce uncertainty as to which boundary has been detected.

Such loss of time and uncertainty are unacceptable in high performance tape drives. The servo needs to know the position of the relevant boundary in order to optimally reposition the drive mechanism. Since, generally, the tape position is not the same as the boundary position by the time a retry signal is received, it is necessary for the position of the boundary to be stored in the processing system prior to the determination that a retry is necessary.

Accordingly, some high-performance streaming tape drives routinely record the position data block boundaries as they are detected. A typical sequence would be:

the read circuitry detects a boundary and signals the detection to the servo controller; the servo controller responds to the detection signal by accessing a tape position indicator for a boundary mark position value; this value is stored. If an retry is required, the tape transfer is stopped, the tape position indicator is accessed again for a current position value. The current position value is compared to the stored position value, and then a retry start point is calculated. The servo issues back-spacing commands and monitors the tape position indicator until its reading matches the calculated value.

While providing an improvement in precision over prior re-try method, the just-described method is not satisfactory for state-of-the-art streaming tape drives. While there are multiple factors leading to this inadequacy, a major one is the uncertainty introduced by the delay in servo controller response to a boundary detection. Since the servo controller is responsible for a great number of functions and must continually poll a multitude of inputs, there can be a small, yet significant, delay of uncertain duration between receipt and recognition of a boundary detection signal by the servo controller 19. This delay translates into an uncertainty in the accuracy to which the stored boundary position value represents the actual position of that boundary on the tape.

To provide some dimensions to the problem, in one instance, such a system could provided virtually instantaneous recognition of a detection signal, while in another case, successive sequences of instructions, with each instruction involving one to several clock cycles, may be executed before recognition. There is no well defined upper boundary, and a 50 clock cycle delay would not be improbable. With a, for example, 1.6 MHz clock with tape at 200 inches per second, the positioning precision would be limited to 10 mils.

This retry scenario is one example where it is necessary to have access to a very accurate stored position mark value. Thus, what is needed is an improved tape drive system incorporated a more accurate approach to position capture.

SUMMARY OF THE INVENTION

A tape drive system includes dedicated position capture circuitry, in communication with mark detection circuitry, which provides for timely accessing and local storage of position marks in a data stream. The position marks can be, for example, data block boundary marks, so that precise positioning is provided during re-tries.

The tape drive system, which provides for reading user and system information stored on a moving tape medium, includes a transducer, a drive mechanism, a servo controller, a tape position indicator, mark detection circuitry and the position capture circuitry. In the context of an embodiment for a streaming tape drive for magnetic recording tape, the transducer is a read head which converts magnetic flux levels into discrete voltages. Read circuitry, incorporating the mark detection circuitry and the position capture circuitry, segregates user data for output, performs formatting functions and error detections. Detected errors are corrected where possible, and, otherwise, communicated to the servo controller to initiate a retry or other appropriate action.

In an exemplary embodiment of the present invention, the incorporated position capture circuitry has input lines dedicated to each of four position request or detection signals. The signals are gap-to-block boundary, block-to-gap boundary, supply-reel position mark, and position request by servo controller. When any of these lines is active, the signal is converted on a one-shot basis to a four-clock cycle long active signal. This duration is selected so that each line can be polled for a clock cycle to determine whether a request or detection has occurred. If so, a position value transfer is enabled from the speed indicator to a four address register of the position capture circuitry. The addresses of the register are accessed cyclically and synchronously with the polling of the request or detection lines so that when a line is active the current position value is directed to the corresponding dedicated register address.

In the case of a re-try, the servo controller can stop the drive mechanism, access the position indicator, directly or indirectly, for a current position, and access the storage for the value of the position of interest. In the above exemplary embodiment, both the current and boundary values are acquired by accessing appropriate addresses of the register in the position capture circuitry.

By comparing the current and boundary position values, the servo can calculate the position from which a retry must be started in order to ensure an appropriate speed is achieved just prior to the beginning of the data block of interest. In performing this calculation, the servo controller can use other data, such as the amount of tape on the supply reel as determined through comparison of data from the supply reel speed indicator and the tape speed indicator. The servo controller can transfer the tape in the reverse direction while monitoring the tape position indicator until the calculated and current tape position match.

The uncertainty in the stored tape position values is a function of the number of lines being polled and the length of a clock cycle. Under a reasonable implementation of four signal lines and a 600 nanosecond clock cycle (1.6 MHz clock), the uncertainty in time is less than 5 $\mu$S. At a tape speed of 200 inches per second, this provides positioning accuracy to within one mil. This provides an order of magnitude improvement compared to the uncertainty introduced by servo controller initiated position value requests.

BRIEF DESCRIPTION OF THE DRAWINGS

FIG. 1 is a combination plan view and block diagram of a tape drive system in accordance with the present invention.

FIGS. 2a and 2b constitute FIG. 2, a two-part block diagram of position capture circuitry and a speed decoder illustrated in FIG. 1.

FIG. 3 is a timing diagram for the position capture circuitry of FIG. 2.

DESCRIPTION OF THE PREFERRED EMBODIMENTS

In accordance with the present invention, a tape drive system 11, for reading information stored on a tape 13, includes a drive mechanism 15 for, a transducer read head 17, a servo controller 19, read and mark detect circuitry 21, a speed decoder 23, and position capture circuitry 25. The position capture circuitry 25 provides for improved tape position determinations relative to position marks encoded on the tape 13.

In order to accomplish the foregoing advantage, the illustrated position capture circuitry 25 includes a register 27 with addresses 31, 32, 33 and 34, each dedicated to storing a position value for a predetermined type of position request or detection. Specifically, in the illustrated embodiment, gap-to-block boundary position values are stored in address 31, block-to-gap boundary position values are stored in address 32, tape positions at the time of requests by the servo controller 19 are stored in address 33, and reel encoder position values are stored in address 44.

Corresponding to the four addresses 31, 32, 33 and 34, respectively, are four inputs 41, 42, 43 and 44 to the position capture circuitry. When an active signal is applied at one of these inputs, the position capture circuitry issues a STORE signal along line 47 to the speed decoder 25 which responds by transmitting the current position count along bus 49 to the position capture circuitry 25. The position capture circuity provides the synchronization so that the received count is stored in the appropriate address of register 27.

When the servo controller 19 requires the current tape position, it issues a tape position request at input 43, and the position capture circuitry 25 accesses the current position value in the speed encoder 23 and stores it in address 33. The servo controller 19 can then address register 27 along line 51 and the data stored in the accessed address 33 is directed along bus 53 to the servo controller 19. Likewise, when the servo controller 19 requires block boundary data or reel encoder data, the appropriate address 31, 32 or 34 is transmitted via line 51, and the desired data is received along bus 53. These transfers are detailed following the description of the cooperating components.

The drive mechanism 15 includes a supply reel 51 and a take-up reel 53 between which tape 13 is transferred. Each reel is driven by a respective motor, neither of which are shown, in response to control signals from the servo controller 19. The tape 13 is transversely positioned with respect to and urged against head 17 for precise reading of dense multi-track data by a supply side guide 65 and a take-up side guide 57. A buffer arm 59, which is tensioned by a spring 61, is used to maintain tape tension during tape transfer.

The servo controller 19 controls tape transfer by issuing, along drive command line 63, start, stop, increase speed and decrease speed commands to the motors of the drive mechanism 15. The servo controller 19 is responsive to user and other system commands, as well as to data from sensors monitoring the action of the tape drive system 11. For example, a buffer arm position sensor, not shown, communicates buffer arm position data along buffer arm position sensor line 65. In response to this data, the servo can issue differential speed adjustment commands along drive command lines 63 to optimize tape tension during transfer.

In addition, the servo controller 19 monitors tape speed by means of an optical element and sensor, neither shown, attached to the shaft of rolling take-up side tape guide 57. A speed encoder, not shown, converts sensed marks into quadrature speed signals which are made available to the servo controller 19 by means of a pair of lines, not shown. The servo controller 19 utilizes this information to maintain an optimal tape speed.

The quadrature encoded speed information is also directed to the speed decoder 23 along quadrature speed data lines 67. The speed data is encoded in quadrature so that tape direction, as well as tape speed, is represented. The speed decoder 2 counts up as the tape is transferred from supply reel 51 to take-up reel 53, and counts down when tape direction is reversed. Thus, the speed decoder 23 regularly stores a value indicating tape position with respect to a predetermined physical position along the tape 13.

The read and mark detect circuitry 21 receives information from the transducer read head 17 in the form of binary data represented by discrete voltage levels. The illustrated tape drive system 11 uses 9 tracks of data on the tape, so the bus 69 to the read and mark detect circuitry 21 is 9 bits wide. Generally, the 9-bits relates to 8-bit data with an additional bit for error correction code.

The main function of the read and mark detect circuitry is to provide user data along the 8-bit wide bus 71. To execute this function reliably, the read and mark detect circuitry 21 performs de-skew, error detection and correction, and mark detection functions, in accordance with an implemented information retrieval strategy.

Included with the read and mark detect circuitry 21 is the ability to detect data block boundaries. In the illustrated embodiment, these boundaries are characterized as gap-to-block boundaries which mark the beginning of a data block, and block-to-gap boundaries which mark the end of a data block.

When a gap-to-block boundary is detected, the read and mark detect circuitry 21 sends an active signal to input 41 of the position capture circuitry 25. This causes the speed decoder 23 to be accessed and the resulting value stored in address 31 of register 27. Likewise, when a block-to-gap boundary is detected, the read and mark detect circuitry 21 sends an active signal to input 42 of the position capture circuitry 25, so that a current position value is stored in address 32 Thus register 27 normally maintains the positions of the most recently detected beginning and ending data block boundaries in respective addresses 31 and 32.

Thus, for example, for the servo controller 19 to obtain a current tape position relative to the position of a gap-to-block boundary, it can issue a position request and obtain the captured current position value at address 33, and then obtain the most recent gap-to-block boundary position value at address 31; compare the two. Similarly, address 32 can be accessed when the physical position relative to a block-to-gap boundary is required. Of course, a similar scheme can accommodate many variables of interest. As a further example, an encoder for the supply reel can send position detections to input 44 of the position capture circuitry, and the resulting position value can be stored at address 34.

The position capture circuitry 25, along with its interface to the speed decoder 23, is described in greater detail with respect to FIG. 2, which is divided into FIGS. 2A and 2B. The position capture circuitry includes four sections, an input polling state machine 101, a timing section 103, both shown in FIG. 2A, a data bus multiplexing section 105, and register 27, the latter two shown in FIG. 2B. Shown interfaced with the register 27 is the speed decoder 23.

The function of the input polling state machine 101 is to poll the inputs 41, 42, 43, 44 for position requests and detections. An active input is translated by this section to an enable OE^on the speed encoder 23 to effect a transfer of its contents to register 27. In the illustrated embodiment, the speed encoder 23 and the register 27 are 12-bit devices, while the input bus 49 to the register 27, and the output bus 53 from the register are 8-bit buses. Accordingly, data bus multiplexing section 105 coordinates two-stage data transfers along buses 49 and 53.

The timing section 103 coordinates the action of all components of the position capture circuitry and the speed decoder 23, and provides the synchronization ensuring that data transferred from the speed encoder 23 is stored in the register address 31, 32, 33 or 34, dedicated to the input line 41, 42, 43 or 44, that activated the transfer. In the illustrated embodiment, the timing section 103 comprises a counter 115, which can be a 74ALS163N. It functions as a clock divider to produce, from a basic CLK1 signal, a synchronous CLK4 signal with four times the cycle time of CLK1, and a synchronous CLK8 signal with eight times the cycle time of CLK1. A 33% duty-cycle CLKM signal is also provided at twice the frequency of and with its falling edge coinciding with each transition of CLK1. The relations between these clock signals is depicted in the timing diagram of FIG. 3.

The input polling state machine 101 has a first quad D flip-flop 117, a second quad D flip-flop 119, four AND gates 121, and a multiplexer 123. Both flip-flops 117 and 119, which can be 74ALS175N devices, have their "CLR" clear inputs held inactive, and their leading edge triggered "CLK" clock inputs driven by CLK8. Thus, the levels the input lines 41, 42, 43, and 44 at the beginning of a CLK8 clock cycle are reflected at the respective first flip-flop 117 outputs Q1, Q2, Q3, and Q4. One CLK8 cycle later, inverted values are provided by the second flip-flop 119 at complementary outputs Q1ˆ, Q2ˆ Q3ˆand Q4.ˆ

The effect of this arrangement is that an AND gate 121 only outputs a true when the respective input line 41, 42, 43, 44 is active at the onset of a CLK8 cycle, and then only for one CLK8 cycle. To describe this operationally, assume initially, all inputs 41, 42, 43 and 44 are inactive, the outputs Q1, Q2, Q3 and Q4 of flip-flop 117 are low, and the complementary outputs Q1ˆ Q2ˆ Q3ˆ and Q4ˆare correspondingly high. If gap-to-boundary input line 41 is high at the onset of the next CLK8 cycle, Q1 of flip-flop 117 will be forced high and Q1ˆof flip-flop 119 will remain high. Thus, the corresponding AND gate 121 will have both its inputs high and will yield a high output. One CLK8 output later, the Q1ˆof flip-flop 119 will go low, so that the output of the respective AND gate will go low. Thus, the flip-flops 117 and 119 and AND gates 121 function collectively as a synchronized four-track digital quad one-shot.

Select inputs A and B of multiplexer 123, which can be a 74ALS153N dual 4:1 multiplexer, half of which is used in the illustrated embodiment, are driven, respectively by CLK4 and CLK8 so that all four inputs are polled every CLK8 cycle. In other words, the multiplexer switches synchronously with CLK2, depicted in FIG. 3 only. CLK2 and CLK2', which is 90° out of phase with respect to CLK2, are drive-system-wide clock signals having twice the cycle time as CLK1. Since, by the upstream one-shot function, any signal active at the multiplexer 123 inputs C0, C1, C2 and C3 is active for an entire CLK8 cycle, so representation of the active signal is assured at output Q1 of multiplexer 123.

The output Q1 functions as a STORE signal to the PRE inputs of data bus multiplexer section 105, as described below. The form of this STORE output from Q1 of multiplexer 123 is illustrated in the timing diagram of FIG. 3 for the case in which the gap-to-block boundary input line 41 and the block-to-gap boundary input line 42 are active, while the remaining input lines 43 and 44 are inactive. This STORE signal is inverted at inverter 127, so that the active low enable OE of speed decoder 23 is activated when STORE is high. The relationship of STORE and the OEˆinput of speed decoder 23 is illustrated in FIG. 3. When so enabled, the speed decoder 23 transfers its contents to register 27 along bus 49.

Register 27 comprises three 4×4 registers 131, 133 and 135, which can be 74LS670 type devices. Each of the 4×4 registers 131, 133 and 135 includes the following inputs and outputs: data inputs D1, D2, D3 and D4; data outputs, Q1, Q2, Q3 and Q4; a write enable GWˆ a read enable GRˆ a lower order write address WA, a higher order write address line WB, a lower order read address line RA, and a higher order write address line RB.

The illustrated speed decoder 23 accepts inputs at CHA and CHB originated by the speed sensor, converted to quadrature by a quadrature encoder, and transmitted along lines 67A and 67B. The sensor, encoder and decoder 23 function together as a position indicator. The illustrated decoder 23 is an HCTL 2000 produced by Hewlett-Packard Company, and provides 12-bit resolution, and thus storage, but only eight data output lines. Thus, two transfers are required to send full-resolution position indications. Accordingly, a select "SEL" input permits toggling of the output between the four higher order bits and the eight lower order bits.

This "SEL" input is driven by the output of data bus multiplexing sectioon 105. An SEL signal is illustrated in FIG. 3 for the case where the boundary detections are active and the reel encoder and servo request lines are not.

Section 105 includes a first JKˆ flip-flop 141 in series with a second JKˆflip-flop 143. The preset "PRE" inputs of are controlled by the STORE output of state machine IO1. The STORE signal is shown in FIG. 2B governed by a buffer 125 with an enable tied to a system reset "SYSRESET" line. This functional arrangement can be implemented by an AND gate with the STORE and the SYSRESET lines as inputs.

The J input of flip-flop 141 is held high; and the clear "CLR" inputs of both JKˆflip-flops are held inactive. In the absence of an active detection or request signal, the preset "PRE" inputs of both JK flip-flops 141 and 143 are held active so outputs 1Q and 2Q are high and output 1Q is low. During a high STORE signal from state machine 101, the PRE inputs of the JKˆflip-flops are inactivated, and the flip-flops are clocked by CLKM. The first JKˆflip-flop is held in toggle mode so outputs 1Q and 1Qˆinvert every CLKM clock cycle, producing timing signals with cycles twice that of CLKM. In other words, the first JKˆflip-flop 141 outputs a timing signal with the same cycle time as CLK1.

The second JKˆflip-flop 143 has its J and Kˆinputs tied to the 1Q and 1Q outputs, respectively, of the first JKˆS flip flop 141. As a result, its output 2Q, which is preset at "1", switches to "0" on the first CLKM input, and then toggles at ½ the rate of 1Q. Thus, 2Q has the same frequency as CLK2.

Accordingly, the 2Q output drives the SEL input of the speed decoder 23. When OEˆis active and SEL is low, the four higher bits of the stored position value are transferred along input data bus 49 to 4×4 register 131. Then, when SEL goes high, the lower eight bits are transferred via bus 49 to 4×4 registers 133 and 135.

In order for the transfer to be effected, the appropriate write enable inputs GWˆof the 4×4 registers must be activated. This is ensured by the lower half of a dual 2:4 decoder chip 145. The 1Q and 2Q outputs of the JK^ flip-flopsare directed to 2A and 2B select inputs of the permanently enabled decoder chip 145. The lower half of the chip counts at the rate of one CLK1 cycle per count through a cycle starting at the preset of 11 for 1Q, 2Q then 00, 10, 01 and 11 then back to 00.

The first and third of these activate outputs 240 and 241 respectively. The unused outputs 242 and 243 occur during settling times during which the values on the data lines are uncertain. Thus, for 4×4 register 131, the write enable input GW^is activated by 2Y0 while the transferred higher order 4 bits are guaranteed valid, and for 4×4 register 133 and 135, the write enable inputs GW^are activated by 241 while the transferred lower order 8 bits are guaranteed valid.

The register 27 is read with similar timing considerations. Most of the timing is generated independently by the servo controllor 19 as it requests values stored in the register 27. The addresses are conveyed along lines PA[1] and PA[2] to inputs RA and RB of each 4×4 register. A read request from the servo controller 19 generates a READ signal and an H/L signal at twice the rate of the READ signal. The READ and H/L signals serve to control the multiplexing of the data output bus 53 in a manner analogous to that which the outputs of the JK^flip-flops 141 and 143 govern the multiplexing of the input data bus 49.

The timing chart of FIG. 3 provides an example of the operation of the position capture circuitry for the case in which the boundary mark detection lines 41 and 42 are active, and the remaining input lines 43 and 44 are inactive, as indicated near the bottom of FIG. 3. When CLK8 next goes high, the input values are transferred to the respective inputs of multiplexer 123 for one CLK8 cycle. The one-shot function of the D flip-flops 117 and 119 and AND gates 121 forces all inputs to the multiplexer to zero, unless one of the inactive inputs becomes active before the next rising edge of the CLK8 cycle.

As a result of the given input pattern, the STORE output of the multiplexer 123 is high for the first two quarters of the CLK8 cycle and low for the next two quarters as shown in FIG. 3. The OE^input to the speed decoder 23 mirrors its complement, STORE, as shown. Thus, both the data bus multiplexing section 105 and the speed decoder 23 are active during the CLK8 quarter cycles corresponding to the boundary detection inputs at lines 41 and 42, and inactive during the rest of the CLK8 cycle.

While STORE is active high, the pair of JK flip-flops produces at output 2Q the SEL signal which drives the multiplexing for the speed decoder 23. Outputs 1Q and 2Q are used to cycle through the 240-243 outputs of the dual 2:4 decoder 145, the GW^inputs being combined in FIG. 3. In other words, the first and third active lows are transmitted from 240 to GW^of 131, while the second and third active lows are transmitted from 241 to GW^of 4×4 registers 133 and 135. The address lines WA and WB of the 4×4 registers driven by the CLK4 and CLK8, and thus are cycled through synchronously with multiplexer 123, so that the writes are stored in the addresses dedicated to the input being sampled at the time.

Due to the offset of CLKM, SEL and GW^are activated long enough after OE^to ensure valid data is transferred. In other words, valid data is on-line prior to the end of each GW^active signal. Thus, the position capture circuitry provides for detected and requested positions to be stored in respective dedicated addresses 31, 32, 33 and 34.

The stored values are updated as frequently as appropriate, limited only by the CLK8 cycle time, which in the illustrated embodiment is 2.4 $\mu$S. In a worst case analysis, a reel encoder detection signal could be issued just after a CLK8 cycle has begun, so that two CLK8 cycles could pass before the requested value is stored. The delay is than 4.8 $\mu$S. Thus, a tape drive system operating at 200 inches per second would achieve a positioning accuracy within 1 mil.

This is to be contrasted with prior art systems in which the delays can vary unpredictably over a range at least an order of magnitude greater. Thus, the present invention provides for much greater positioning accuracy for a tape drive system. This means that greater densities can be managed with less wasted motion, yielding a substantially greater data throughput.

Of course, the specifics of the timings vary in embodiments with different tape speeds, clock cycle times, numbers of position types polled and other variables. In sddition, many of the functions of the position capture circuitry can be implemented in alternative ways. Furthermore, the structure of the position capture circuitry can be altered to correspond with different interfacing arrangements with surrounding components.

What is claimed is:

1. A tape drive system for reading information stored on a moving tape medium, said information including user data and system data, said system data including encoded position marks, said system comprising:
    tranducer means, including a head, for converting information, stored on a tape being transferred across said head, to a data steam suitable for processing;
    drive means for transferring tape across said head, said drive means being adapted to start, stop, increase the speed of, and decrease the speed of tape transfer in response to received drive control signals;
    position indicator means for measuring tape position with respect to a predetermined position on a tape being transferred across said head;
    mark detection means for detecting the occurrence of an encoded position mark in a data stream;
    clock means for generating a clock signal with a predetermined constant cycle time;
    servo means for regulating tape transfer across said head, said servo means being arranged to have access to current position values of said position indicator means, said servo means including means for calculating a current position relative to a mark position from a current position value and a received mark position value, said servo means including means for requesting a mark position value, said servo means being adapted for issuing drive control signals to said drive means in response to a calculated current position relative to a mark position as prescribed by a predetermined tape positioning strategy; and
    position capture means for accessing and storing mark position value readings of said position indicator in response to mark detections by said mark detection means, said position capture means being adapted for receiving a request for a stored mark position value from said servo means and for transmitting a stored mark position value to said servo means in response thereto, said position capture means including a register for storing mark position values and being adapted for concurrently storing values for plural types of positions, at least one of said types being a type of mark position corresponding to a detection by said mark detection means, and at least one of said types being a requested position corresponding to a current position request by said servo means, said register including plural addresses, each address being dedicated to a respective type of position, said position capture means further including means for successively accessing all addresses of said register on respective successive clock cycles, said position capture means further including multiple position store command lines, means for successively polling each position store command line sychronously with the action of said means for successively accessing addresses, and means for enabling a transfer of a position value from said position indicator means to said register when a polled position store command line is active so that a position value is stored at as respective dedicated address.

2. The tape drive system of claim 1 wherein said position capture means includes one-shot means for converting an active signal on one of said position source command lines into a substantially square pulse, the duration of which is equal to the clock cycle time multiplied by the number of command lines polled by said polling means, said one-shot means acting on all command lines synchronously so that each command line triggers exactly one position value per command.

* * * * *

UNITED STATES PATENT AND TRADEMARK OFFICE
CERTIFICATE OF CORRECTION

PATENT NO. : 4,752,846
DATED : June 21, 1998
INVENTOR(S) : Kraig A. Proehl

It is certified that error appears in the above-identified patent and that said Letters Patent is hereby corrected as shown below:

Claim 1, column 10,
Line 35, "steam" should read -- stream --

Claim 2, column 12,
Line 10, "source" should read -- store --

Signed and Sealed this

Eighteenth Day of September, 2001

Attest:

NICHOLAS P. GODICI
Attesting Officer
Acting Director of the United States Patent and Trademark Office